United States Patent
Kawano

(10) Patent No.: US 9,665,753 B2
(45) Date of Patent: May 30, 2017

(54) NON-CONTACT COMMUNICATION METHOD DETERMINATION CIRCUIT, NON-CONTACT COMMUNICATION CIRCUIT, AND IC CARD

(71) Applicant: Masaharu Kawano, Osaka (JP)

(72) Inventor: Masaharu Kawano, Osaka (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/891,603

(22) PCT Filed: Jun. 2, 2014

(86) PCT No.: PCT/JP2014/065164
§ 371 (c)(1),
(2) Date: Nov. 16, 2015

(87) PCT Pub. No.: WO2014/196646
PCT Pub. Date: Dec. 11, 2014

(65) Prior Publication Data
US 2016/0117535 A1    Apr. 28, 2016

(30) Foreign Application Priority Data

Jun. 3, 2013  (JP) ................................. 2013-117064

(51) Int. Cl.
*G06K 7/10* (2006.01)
*B42D 25/305* (2014.01)
(Continued)

(52) U.S. Cl.
CPC ....... *G06K 7/10366* (2013.01); *B42D 25/305* (2014.10); *G06K 7/10138* (2013.01);
(Continued)

(58) Field of Classification Search
CPC ............. B42D 25/305; G06K 19/0723; G06K 7/10138; G06K 7/10366; H04B 5/0031; H04B 5/0037; H04B 5/0075
See application file for complete search history.

(56) References Cited

U.S. PATENT DOCUMENTS

| | | | |
|---|---|---|---|
| 7,889,817 B2* | 2/2011 | Park ................... | G06K 19/0723 375/150 |
| 2007/0209696 A1 | 9/2007 | Duerr et al. | |

(Continued)

FOREIGN PATENT DOCUMENTS

| | | | |
|---|---|---|---|
| CN | 101867649 A | 10/2010 | |
| CN | 102810148 A | 12/2012 | |

(Continued)

OTHER PUBLICATIONS

International Search Report issued on Jul. 8, 2014 in PCT/JP2014/065164 filed on Jun. 2, 2014.

(Continued)

*Primary Examiner* — Sisay Yacob
(74) *Attorney, Agent, or Firm* — Cooper & Dunham LLP

(57) ABSTRACT

A non-contact communication method determination circuit includes a determiner which determines whether or not a binary signal of a received radio signal is a binary signal of a radio signal with any of a plurality of first non-contact communication methods, wherein the determiner is configured to detect a time interval between edges of the binary signal, and compares the detected time interval with a predetermined time interval between edges of a binary signal in the plurality of first non-contact communication methods, so as to determine whether or not the binary signal of the received radio signal is the binary signal of the radio signal with any of the plurality of first non-contact communication methods, and the time interval between the edges of (Continued)

the binary signal is a time interval between falling edges of the binary signal.

12 Claims, 15 Drawing Sheets

(51) Int. Cl.
*H04B 5/00* (2006.01)
*G06K 19/07* (2006.01)

(52) U.S. Cl.
CPC ....... *G06K 19/0723* (2013.01); *H04B 5/0031* (2013.01); *H04B 5/0037* (2013.01); *H04B 5/0075* (2013.01)

(56) References Cited

U.S. PATENT DOCUMENTS

| | | | |
|---|---|---|---|
| 2009/0052348 A1 | 2/2009 | Kato et al. | |
| 2009/0322484 A1 | 12/2009 | Toriyama et al. | |
| 2010/0226461 A1* | 9/2010 | Tomizawa | H04B 5/02 375/340 |
| 2010/0246724 A1* | 9/2010 | Park | G06K 19/0723 375/340 |
| 2010/0248624 A1 | 9/2010 | Miyakawa | |
| 2010/0328045 A1 | 12/2010 | Goto et al. | |
| 2011/0140855 A1* | 6/2011 | Funamoto | H04L 27/2278 340/10.1 |
| 2011/0168242 A1 | 7/2011 | Duerr et al. | |
| 2011/0206142 A1 | 8/2011 | Sung | |
| 2011/0273271 A1 | 11/2011 | Alicot | |
| 2014/0235165 A1 | 8/2014 | Restiau et al. | |

FOREIGN PATENT DOCUMENTS

| | | |
|---|---|---|
| JP | 2002-342725 | 11/2002 |
| JP | 2007-534119 | 11/2007 |
| JP | 2008-263295 | 10/2008 |
| JP | 2009-135865 | 6/2009 |
| JP | 2009-271861 | 11/2009 |
| JP | 2010-9353 | 1/2010 |
| JP | 2010-183423 | 8/2010 |
| JP | 2012-244269 | 12/2012 |
| KR | 20060034240 | 4/2006 |
| WO | WO2013/045362 A1 | 4/2013 |

OTHER PUBLICATIONS

Mar. 23, 2016 European Search Report in corresponding European Patent Application No. EP 14807324.0.

Chinese official action dated Nov. 11, 2016 (including English translation) in corresponding Chinese Patent Application No. 201480043591.9.

Korean official action dated Aug. 31, 2016 in corresponding Korean Patent Application No. 10-2015-7036834.

* cited by examiner

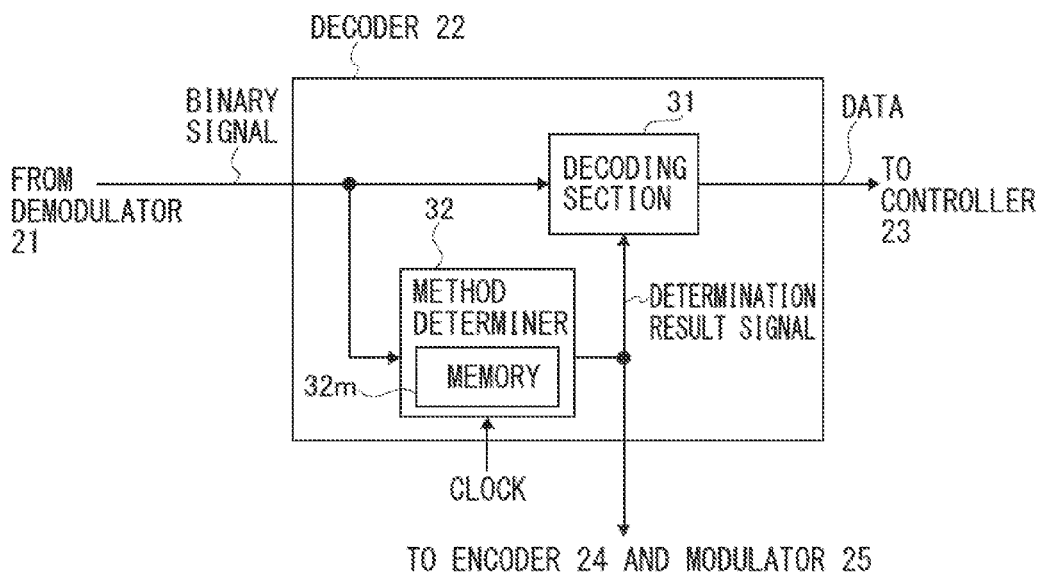
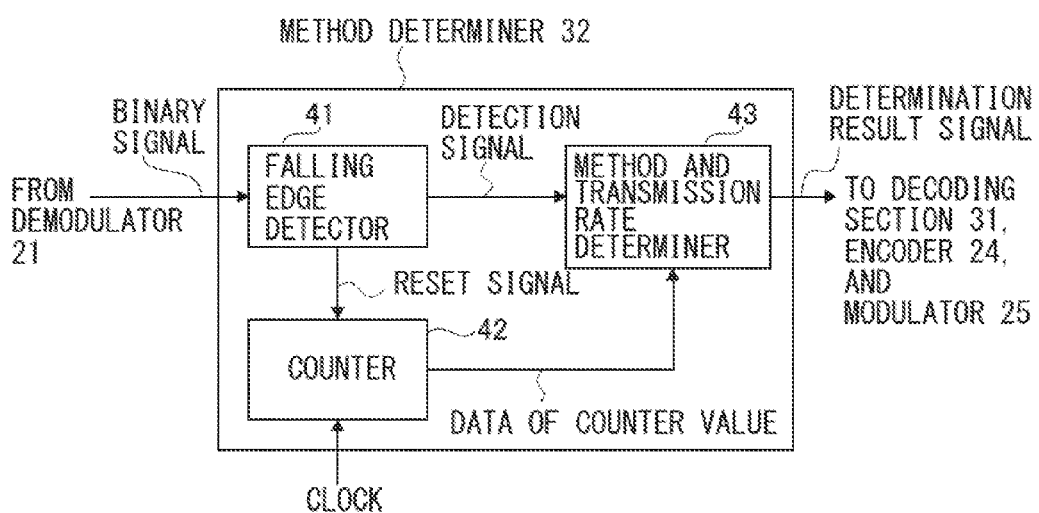

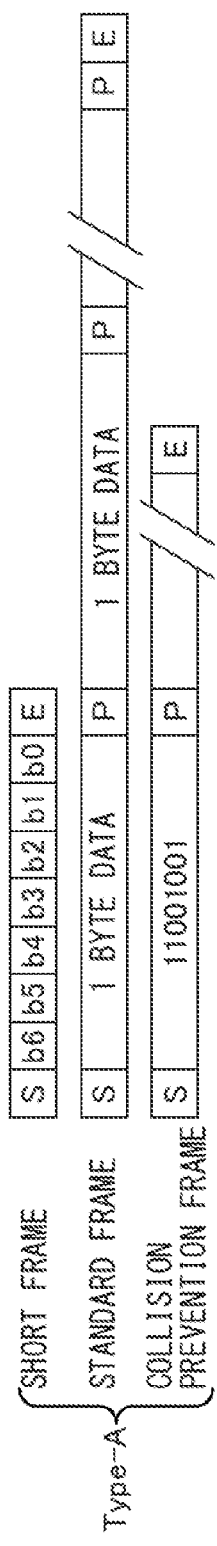
FIG.6A Type-A
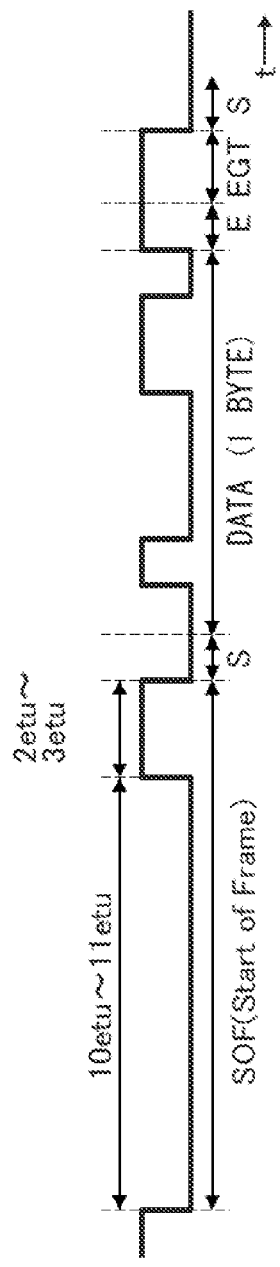
FIG.6B Type-B
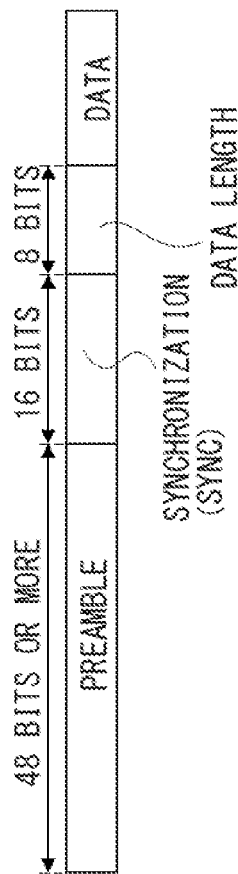
FIG.6C Felica

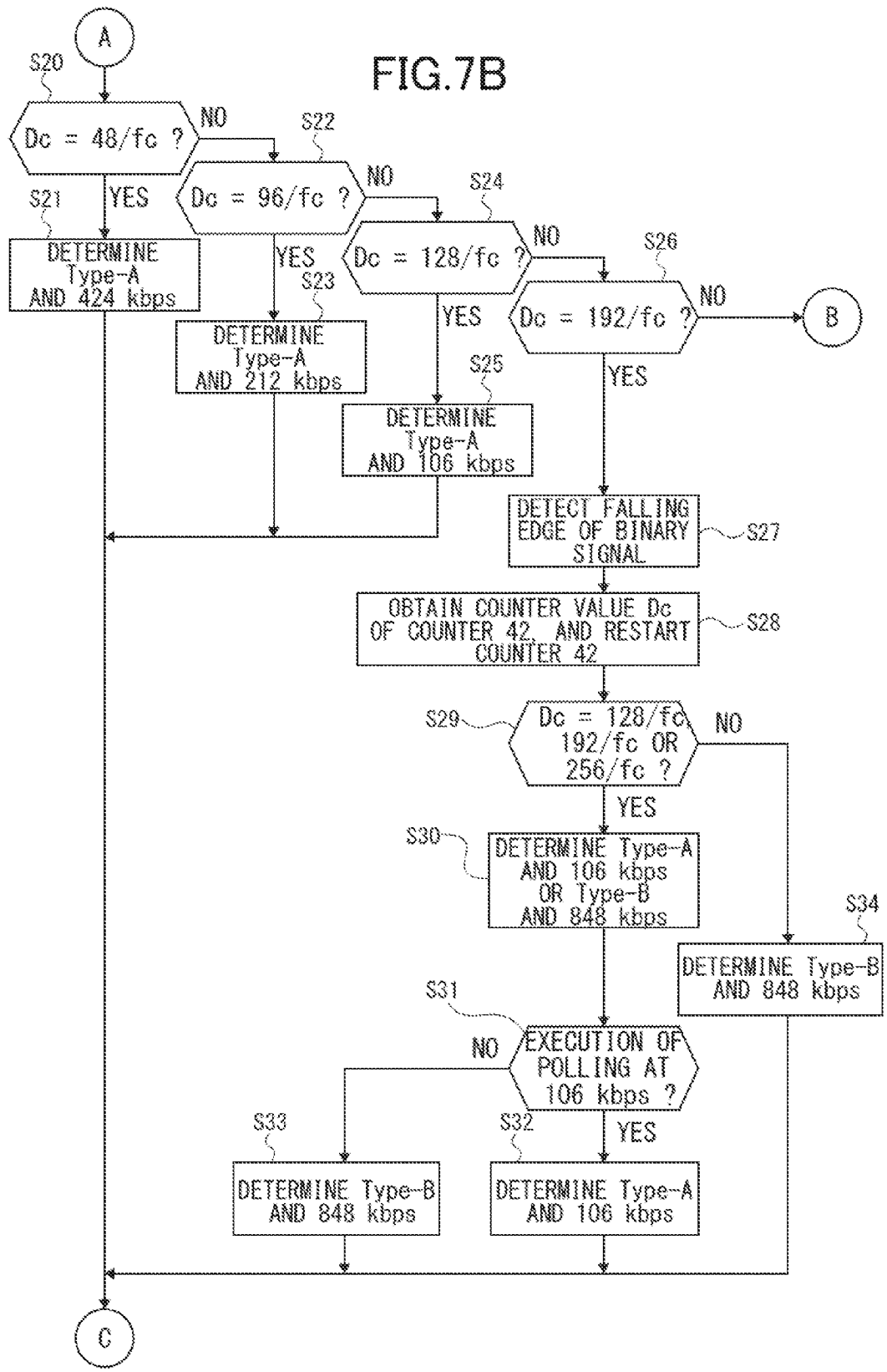

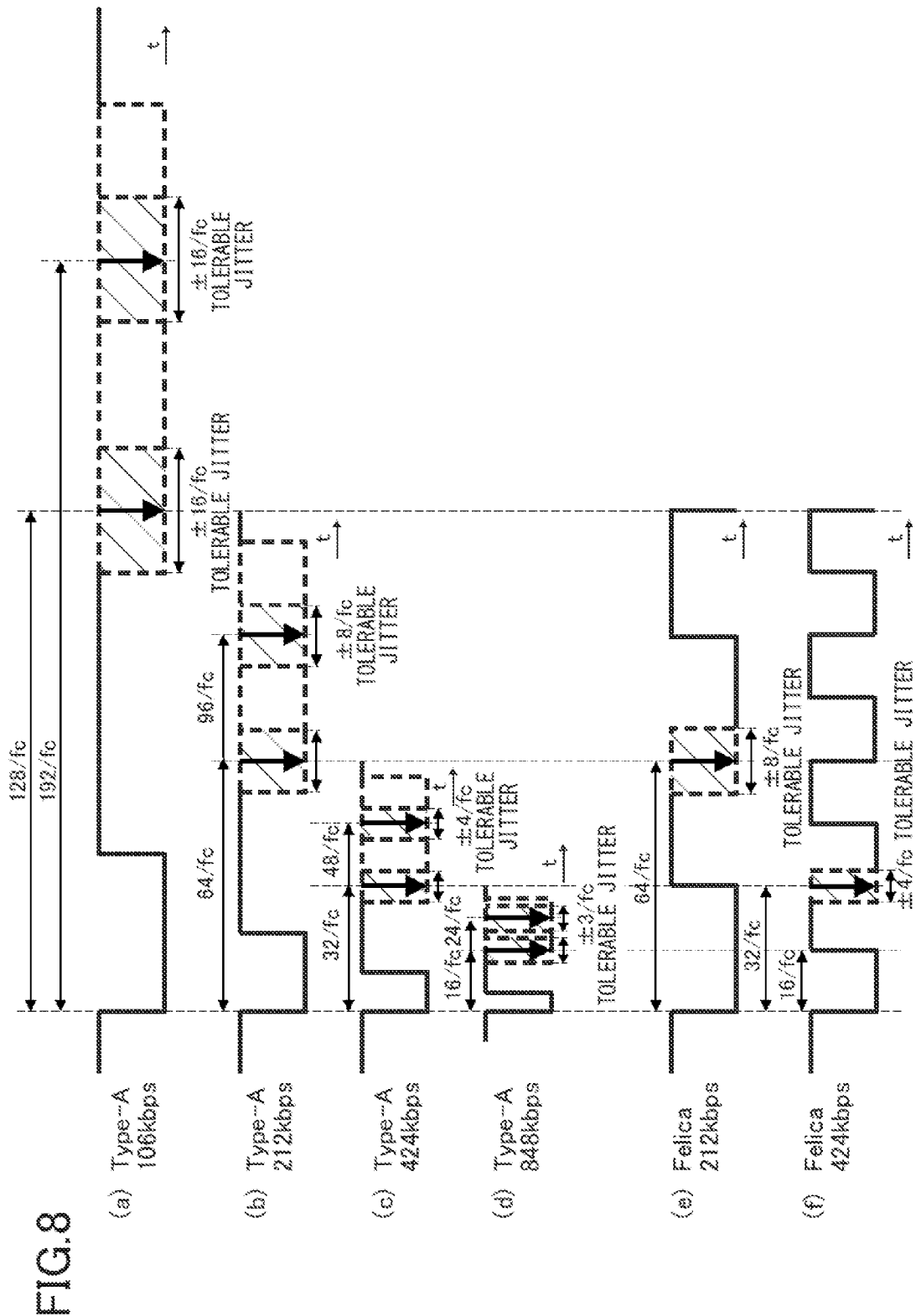

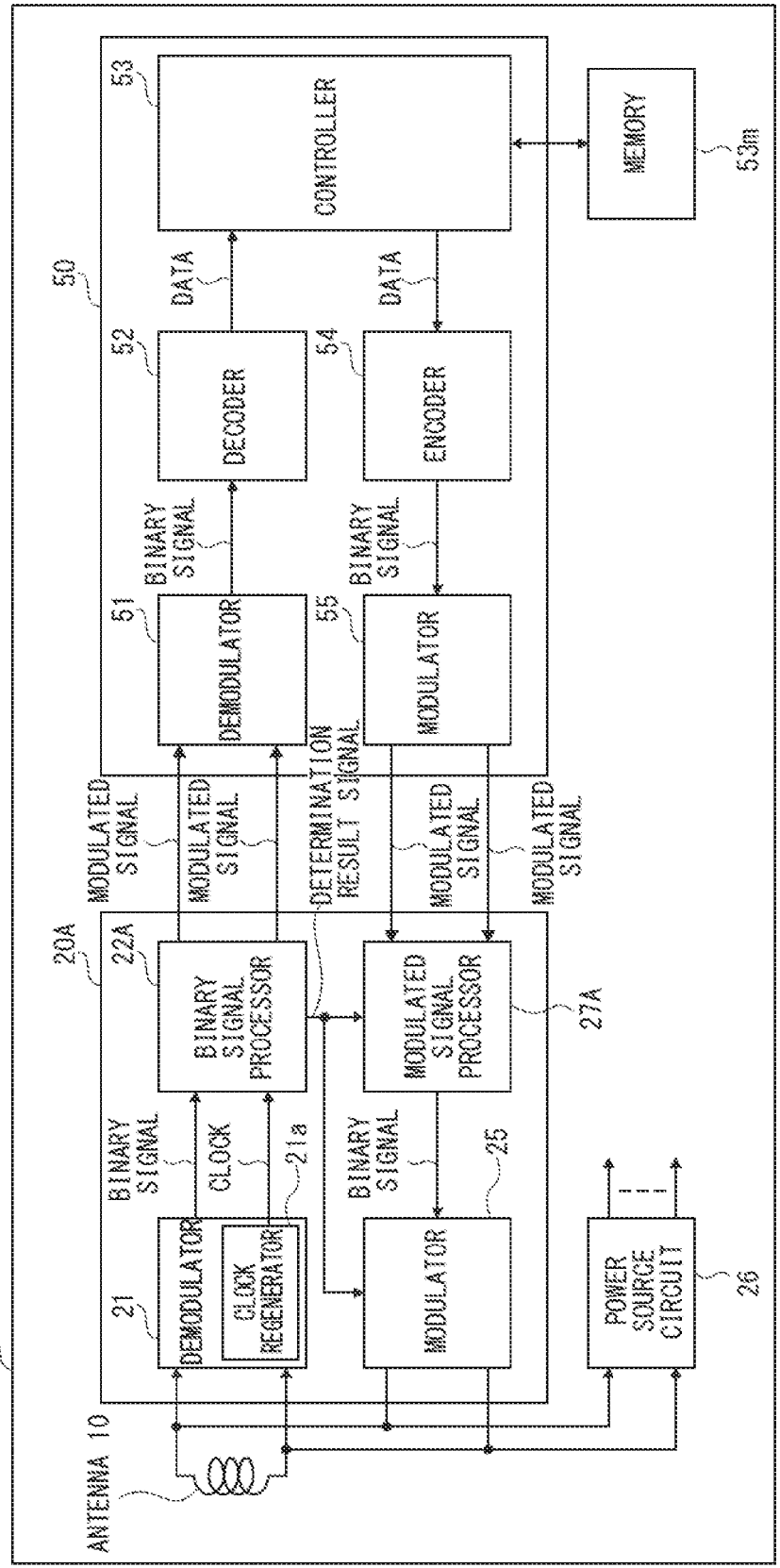

NON-CONTACT COMMUNICATION METHOD DETERMINATION CIRCUIT, NON-CONTACT COMMUNICATION CIRCUIT, AND IC CARD

TECHNICAL FIELD

The present invention relates to a non-contact communication method determination circuit which determines whether or not a binary signal of a received radio signal is a binary signal of a radio signal with any of a plurality of non-contact communication methods, a non-contact communication circuit, and an IC card.

BACKGROUND ART

Recently, the use of non-contact IC cards has become widespread in the fields of electronic money, an electronic tickets or the like. A near-field wireless communication method and a non-contact communication protocol such as Type-A (Type A, registered trademark), Type-B, or Felica, (registered trademark) have been defined International Standards such as ISO/IEC 14443 or ISO/IEC 18092. According to the ISO/IEC 18092, NFCIP-1 (Near-Field Communication Interface and Protocol) is defined while including Felica and Type-A of ISO/IEC 14443. According to ISO/IEC 21481 (NFCIP-2), ISO15693 (non-contact vicinity IC card) and Type-B of ISO/IEC 14443 are defined in addition to NFCIP-1.

It is necessary to determine which of a plurality of communication methods should be applied for sending a frame, such that an IC card or a reader-writer corresponding to a plurality of communication methods decodes data in the communication frame.

For example, Patent Document 1 (JP 2002-342725A) discloses a configuration which measures a pulse width of a binary signal, compares the pulse width with a pulse width defined by each communication method, and selects an identical pulse width, so as to determine a communication method. For example, Patent Document 2 (JP 2010-183423A) discloses a configuration of pattern matching which samples a binary signal with a predetermined clock for a predetermined time, compares the data pattern of the sampling result with a previously held data pattern of each communication method, and selects an identical data pattern.

However, because an analogue circuit is generally used for a demodulator, a binary signal as a demodulation result includes pulse variations due to code interference, distortion, or the like by the analogue circuit. For this reason, it becomes difficult to determine a communication method based on the measurement of the pulse width or the pattern matching, resulting in a communication method determination error.

SUMMARY OF INVENTION

An object of the present invention is to solve the above problem, and to provide a non-contact communication method determination circuit which can prevent a communication method determination error.

To attain the above object, one embodiment of the present invention provides a non-contact communication method determination circuit, including: a determiner which determines whether or not a binary signal of a received radio signal is a binary signal of a radio signal with any of a plurality of first non-contact communication methods, wherein the determiner is configured to detect a time interval between edges of the binary signal, and compares the detected time interval with a predetermined time interval between edges of a binary signal in the plurality of first non-contact communication methods, so as to determine whether or not the binary signal of the received radio signal is the binary signal of the radio signal with any of the plurality of first non-contact communication methods, and the time interval between the edges of the binary signal is a time interval between falling edges of the binary signal, or a time interval between raising edges of the binary signal.

BRIEF DESCRIPTION OF DRAWINGS

FIG. 3 is a block diagram illustrating a configuration of a decoder 22 illustrated in FIG. 2.

FIG. 4 is a block diagram illustrating a configuration of a system determiner 32 illustrated in FIG. 3.

FIGS. 6A to 6C are timing charts illustrating a frame configuration for use in data transmission of communication systems of Type-A, Type-B, and Felica from the reader-writer 2 to the IC card 1 illustrated in FIG. 1.

FIGS. 7A to 7C are flow charts illustrating a communication method determination process which is executed by the method determiner 32 illustrated in FIG. 4; FIG. 7A illustrates a first part of the process, FIG. 7B illustrates a second part of the process, and FIG. 7C illustrates a third part of the process.

FIG. 8 is a timing chart illustrating a setting example of a tolerable jitter of a counter value Dc, which tolerable jitter of a timing of falling of a binary signal, and determines the counter value Dc in the communication method determination process in FIGS. 7A to 7C.

FIG. 9A is a block diagram illustrating the configuration of an IC card 1A according to Embodiment 2 of the present invention.

DESCRIPTION OF EMBODIMENTS

Hereinafter, embodiments of the present invention will be described with reference to the drawings. In addition, the same reference numbers are applied to similar elements in each embodiment.

Embodiment 1

Figure 1:
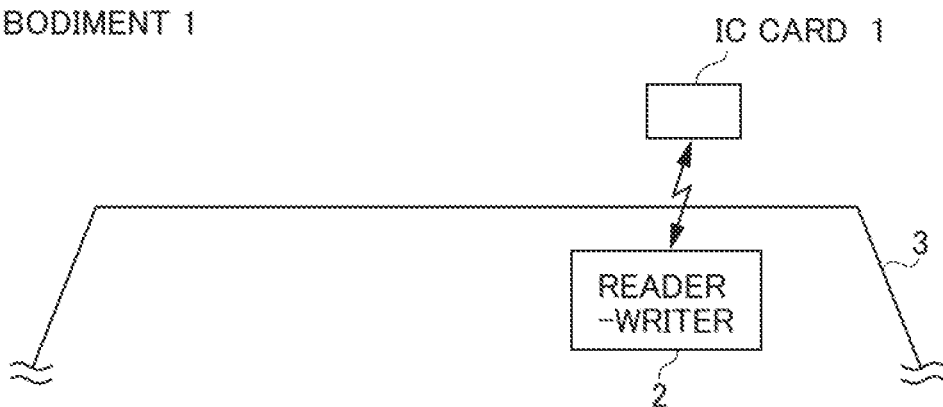
FIG. 1 is a general side view illustrating a configuration of an IC card system according to Embodiment 1 of the present invention.

FIG. 1 is a general side view illustrating the configuration of an IC card system according to Embodiment 1. In FIG. 1, a non-contact communication circuit 20 of the IC card 1 for use in the IC card system of the present embodiment receives a radio signal of a modulated signal. The non-contact communication circuit 20 demodulates the received radio signal into a binary signal, determines which of the binary signals of the radio signals of a plurality of non-contact communication methods (hereinafter, referred to as communication method) illustrated in Table 1, for example, is the binary signal of the received radio signal based on a time interval between falling edges of the demodulated binary signal, and determines which communication method and transmission rate of a plurality of communication methods should be applied for the wireless communication from the reader-writer 2.

In FIG. 1, the reader-writer 2 is provided in an electronic device 3 which identifies and authorizes a user of the IC card 1, and provides a service for a user, for example. The electronic device 3 is, for example, an automatic ticket gate, automatic money machine, or attendance and leaving management device. The reader-writer 2 encodes digital transmitted data by a predetermined communication method using a non-contact communication, generates a binary signal, modulates a carrier wave in accordance with the binary signal, and outputs the modulated carrier wave as a radio signal.

Figure 2:
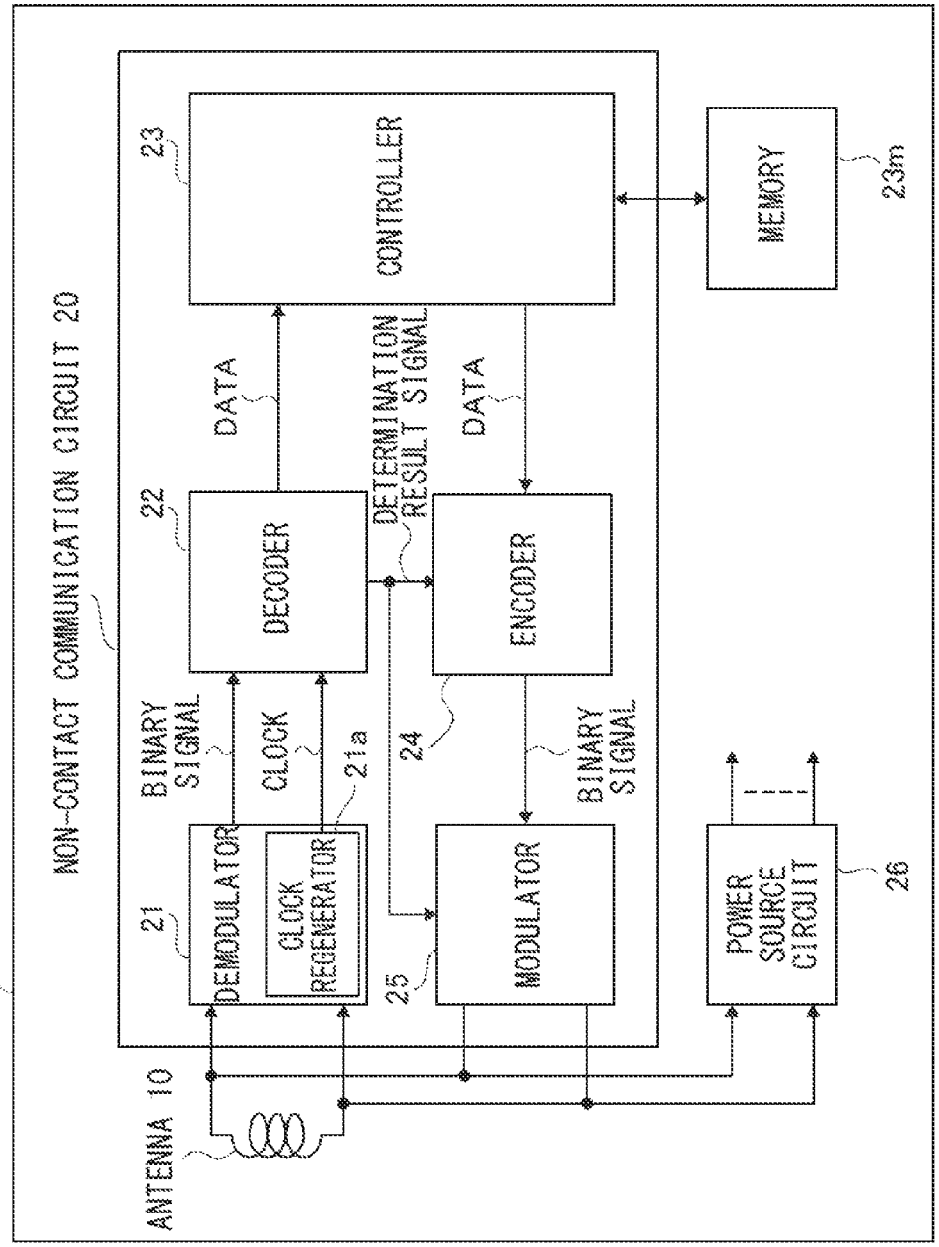
FIG. 2 is a block diagram illustrating a configuration of an IC card 1 illustrated in FIG. 1.

FIG. 2 is a block diagram illustrating the configuration of the IC card 1 illustrated in FIG. 1. Referring to FIG. 2, the IC card 1 includes an antenna 10, the non-contact communication circuit 20 made of a semiconductor integrated circuit such as an LSI, and a power source circuit 26. The non-contact communication circuit 20 includes a demodulator 21, a decoder 22, a controller 23, a memory 23m connected to the controller 23, an encoder 24, and a modulator 25. In FIG. 2, the distance between the IC card 1 and the reader-writer 2 is a short distance, for example, 1 to 30 cm, the antenna 10 receives the radio signal from the reader-writer 2, and outputs the radio signal to the power source circuit 26 and the demodulator 21 as a received signal. The power source circuit 26 receives the received signal as an AC voltage signal, and rectifies it to DC voltage, so as to supply the DC voltage to each section 21, 22, 23, 24, 25, 23m constituting the non-contact communication circuit 20. In this case, the demodulator 21 demodulates the received signal into a binary signal, and outputs the binary signal to the decoder 22. The demodulator 21 includes a clock regenerator 21a which regenerates a clock having a frequency fc based on the received signal having a carrier wave of a frequency fc of 13.56 MHz, for example, and outputs the clock to the decoder 22. One clock is 1/fc.

The decoder 22 decodes the binary signal from the demodulator 21 using a communication method used in the reader-writer 2, generates logical data, and outputs the data to the controller 23. The decoder 22 determines the communication method by using the clock from the clock regenerator 21a based on the binary signal from the demodulator 21, and decodes the binary signal from the demodulator 21 into data with an encoding method defined in the determined communication method. The decoder 22 outputs a determination result signal showing the determination result to the encoder 24 and the modulator 25.

The controller 23 executes a predetermined process based on a program stored in the memory 23m connected to the controller 23 and the data from the decoder 22, generates data to be transmitted to the reader-writer 2, and outputs the data to the encoder 24. The above-described predetermined process includes a process of generating data which should be transmitted, for example, an ID or other data of the IC card 1. The encoder 24 encodes the data received from the controller 23 into a binary signal, and outputs the signal to the modulator 25 using the communication method used in the reader-writer 2 in accordance with the determination result signal from the decoder 22. The modulator 25 modulates the carrier wave into a modulated signal in accordance with the binary signal from the encoder 24, and transmits the signal to the reader-writer 2 through the antenna 10 using a communication method shown in the determination result signal.

FIG. 3 is a block diagram illustrating the configuration of the decoder 22 illustrated in FIG. 2. Referring to FIG. 3, the decoder 22 includes a decoding section 31, and a method determiner 32 to which a clock is supplied from the clock regenerator 21a. The system determiner 32 determines which communication method (modulation method, encoding method, data transmission rate) is used for encoding the binary signal in the reader-writer 2 by using the clock based on the binary signal from the demodulator 21. The method determiner 32 outputs the determination result signal illustrating the determination result to the decoding section 31, encoder 24 and modulator 25. In addition, the system determiner 32 executes the communication method determination process by reading a program of the communication method determination process for determining a communication method and a transmission rate, and data required for executing the program, which are stored in a memory circuit such as a memory 32m in the method determiner 32. The details of the communication method determination process will be described with reference to FIGS. 7A to 7C. The decoding section 31 decodes the binary signal from the demodulator 21 into data, and outputs the data to the controller 23 using the communication method shown by the determination result signal from the method determiner 32.

FIG. 4 is a block diagram illustrating the configuration of the system determiner 32 illustrated in FIG. 3. In FIG. 4, the system determiner 32 includes a falling edge detector 41, a counter 42, and a method and transmission rate determiner 43. The method determiner 32 in FIG. 4 constitutes a non-contact communication method determination circuit, and may include the clock regenerator 21a.

In FIG. 4, the falling edge detector 41 detects the falling of the binary signal from the demodulator 21, outputs a reset signal indicating the detection of the falling of the binary signal to the counter 42, and resets the calculation value of the counter 42 to 0. The falling edge detector 41 outputs the detection signal to the method and transmission rate determiner 43 when detecting the falling of the binary signal. In this case, the counter 42 calculates the pulse of the clock from the clock regenerator 21a, and outputs the data of counter value Dc to the method and transmission rate determiner 43. In addition, a clock can be supplied to the counter 42 from an external circuit.

The method and transmission rate determiner 43 determines which communication method and transmission rate of a plurality of communication methods should be applied for encoding the binary signal with the reader-writer 2 based on the detection signal from the falling edge detector 41 and the data of the counter value Dc from the counter 42. The method and transmission rate determiner 43 outputs the determination result signal indicating the determination result to the decoding section 31. In this case, a plurality of communication methods includes, for example, Type-A, Type-B, and Felica. Table 1 illustrates the specifications of the communication methods, Type-A, Type-B, and Felica.

TABLE 1

| TRANSMISSION DIRECTION | ITEM | Type-A | Type-B | Felica |
|---|---|---|---|---|
| READER-WRITER → NON-CONTACT IC CARD | OPERATION FREQUENCY | 13.56 ± 7 kHz | 13.56 ± 7 kHz | 13.56 ± 7 kHz |
| | MODULATION METHOD | ASK | ASK | ASK |
| | MODULATION DEGREE | 100% | 8 to 14% | 8 to 30% |
| | ENCODING | MODIFIED MIRROR | NRZ | MANCHESTER |
| | TRANSMISSION RATE | 106, 212, 424, 828 kbps | 106, 212, 424, 828 kbps | 212, 424, kbps |
| NON-CONTACT IC CARD → READER-WRITER | SUBCARRIER FREQUENCY | 847.5 kHz | 847.5 kHz | 847.5 kHz |
| | COMMUNICATION METHOD | LOAD SWITCH | LOAD SWITCH | LOAD SWITCH |
| | MODULATION METHOD | OOK OR BPSK | BPSK | OOK |
| | ENCODING | MANCHESTER OR NRZ_L | NRZ_L | MANCHESTER |
| | TRANSMISSION RATE | 106, 212, 424, 828 kbps | 106, 212, 424, 828 kbps | 212, 424, kbps |

Table 1 shows a transmission direction for each communication method, and a modulation method, modulation degree, encoding method, and transmission rate for each communication method. As shown in Table 1, in the specification of each transmission method, for example, the encoding method, modulation method, and transmission rate differ according to a transmission direction of a signal from the reader-writer 2 to the IC card 1 or from the IC card 1 to the reader-writer 2.

FIGS. 5A to 5D are timing charts illustrating a relationship between the binary signal and transmitted data of the encoding method for use in the data transmission with the communication methods of Type-A, Type-B, and Felica from the reader-writer 2 to the IC card 1 in FIG. 1.

In the case of the communication method of Type-A in which the transmission rate is 106 kbps (hereinafter referred to as communication method of Type-A and 106 kbps) illustrated in FIG. 5A, the transmitted data is ASK (Amplitude Shift Keying) modulated by a modulated mirror, and the data of the logical values "1" and "0" is represented based on the position of the signal (hereinafter referred to as pause pulse) in which a magnetic field output in a bit data interval is stopped. In the modulated signal, the bit data having the pause pulse in the center of the bit data shows the logical value "1". The bit data having the pause pulse in the head portion of the bit data and the bit data without having the pause pulse in the head portion of the bit data show the logical value "0". Regarding the communication method and the transmission rate, the time interval between the falling edges formed in the waveform of the binary signal (hereinafter referred to as falling edge interval) is 128/fc or 192/fc. A start bit S having the logical value "0" of one bit is provided in the head of the communication frame.

Figure 5A:
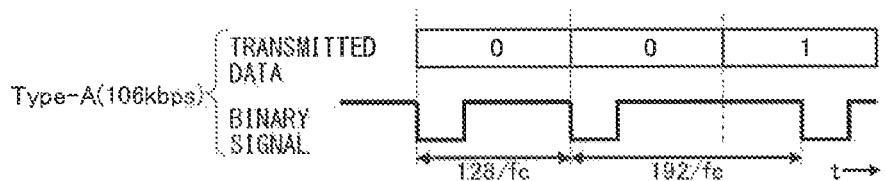
FIGS. 5A to 5D are timing charts illustrating a relationship between a binary signal and transmitted data of an encoding method for use in data transmission of communication methods of Type-A, Type-B, and Felica from a reader-writer 2 to the IC card 1 illustrated in FIG. 1.
Figure 5B:
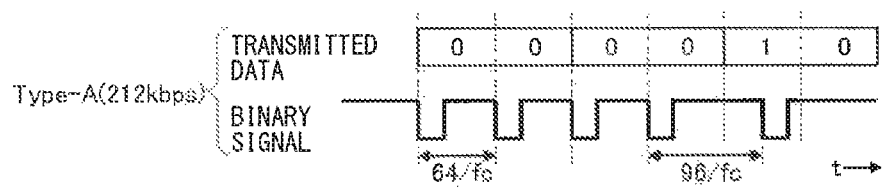

In the case of the communication method of Type-A and 212 kbps illustrated in FIG. 5B, the transmission rate of the binary signal is twice that shown in FIG. 5A. Thus, the binary signal includes the falling edge interval of 64/fc and 96/fc.

Figure 5C:
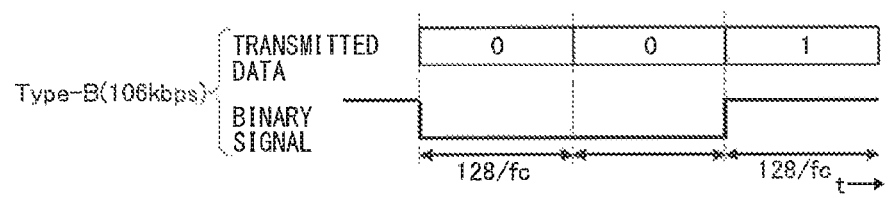

In the case of the communication method of Type-B and 106 kbps illustrated in FIG. 5C, when the transmitted data is transmitted from the reader-writer 2 to the IC card 1, the transmitted data is encoded into the binary signal by an NRZ (Non-Return to Zero) code. The binary signal is further ASK-modulated, so that the logical values "1" and "0" are indicated. A signal having a large amplitude of a carrier wave, which is not modulated, indicates the logical value "1", and a signal having a small amplitude of a carrier wave indicates the logical value "0". Regarding the communication method and the transmission rate, the falling edge interval of the binary signal is, for example, 128/fc. In addition, the head of the data portion of the communication frame includes one bit (data value 0) as a start bit.

Figure 5D:
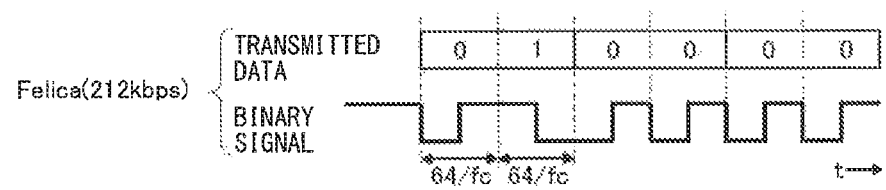

In the case of the communication method of Felica and 212 kbps illustrated in FIG. 5D, the transmitted data is encoded into a binary signal by a Manchester encoding method. The binary signal is further ASK-modulated, so that the data of the logical values "1" and "0" is indicated. The signal having large amplitude of a carrier wave in the first half of the bit data interval and having small amplitude of a carrier wave in the second half of the bit data interval indicates the logical value "1". With this communication method and the transmission rate, a polarity can be distinguished when receiving a specific code in a frame even if a polarity is reversed. A preamble made of the logical value "0" having a length of 48 bits is provided in the head of the communication frame with the present communication method.

As described with reference to FIGS. 5A-5D, the falling edge interval of the binary signal differs with respect to each communication method and transmission rate of a signal.

Table 2 shows a counter value Dc of a standard falling edge interval of each transmission rate of encoding in each communication method of Type-A and Felica, and a counter value Dc from the head of the frame to the next falling edge of each transmission rate of encoding in the communication method of Type-B.

TABLE 2

| | 106 kbps | 212 kbps | 424 kbps | 848 kbps |
|---|---|---|---|---|
| Type-A | 128 or 192 | 64 or 96 | 32 or 48 | 16 or 24 |
| Type-B | 1536 to 1792 | 768 to 896 | 384 to 448 | 192 to 224 |
| Felica | — | 64 | 32 | — |

According to Table 2, the transmission rate of each communication method of Type-A and Type-B includes 106 kbps, 212 kbps, 424 kpbs, and 848 kbps. The transmission rate of the communication method of Felica includes 212 kbps and 424 kbps. The data in Table 2 is stored in the memory 32m, and the method determiner 32 specifies the communication method and transmission rate with reference to the data when executing the communication method determination process.

FIGS. 6A to 6C are timing charts showing a frame configuration for use in the data transmission using the communication method of Type-A, Type-B, and Felica from the read-writer 2 to the IC card 1 in FIG. 1.

The communication frame of Type-A illustrated in FIG. 6A includes a short frame for use in the beginning of the communication, a standard frame for use in a normal command, and a collision-prevention frame for use in a collision-prevention command. Table 3 shows bit data b0 to b6 in the short frame illustrated in FIG. 6A with respect to each command.

TABLE 3

| b6 | b5 | b4 | b3 | b2 | b1 | b0 | |
|---|---|---|---|---|---|---|---|
| 0 | 1 | 0 | 0 | 1 | 1 | 0 | REQA |
| 1 | 0 | 1 | 0 | 0 | 1 | 0 | WUPA |
| 0 | 1 | 1 | 0 | 1 | 0 | 1 | TIME SLOT |
| 1 | 0 | 0 | X | X | X | X | |
| 1 | 1 | 1 | 1 | X | X | X | |

The short frame illustrated in FIG. 6A includes a start bit S having a logical value "0", bit data made of bit data b0 to b6 in Table 3, and an end bit E. In the short frame, any of the bit data b0 to b6 is "1". The standard frame includes a start bit S having a logical value "0", 1 byte data, a parity bit P, and an end bit E. In this case, the 1 byte data and the parity bit P are provided to be alternately located between the start bit S and the end bit E. In FIG. 6A, S denotes a start bit, E denotes an end bit, and P denotes a parity bit. The parity bit is an odd parity. When the number of logical values "1" in the 1 byte data is an odd number, the logical value is "0", and when the number of logical values in the 1 bite data is an even number, the logical value is "1". In the standard frame, either of the 1 byte data and the parity bit P includes the logical value "1".

The communication frame of Type-B illustrated in FIG. 6B includes an SOF (Start-of-Frame) and a start bit S having a logical value "0". In this case, the SOF includes data of a logical value "0" having a length of 10 etu to 11 etu (elementary time unit. 1 etu is a data transmission time of one bit) and data of a logical value "1" having a length of 2 etu to 3 etu. In addition, 1 etu in each transmission rate is set to 128/fc, 64 kbps, 32 kbps, 32 kbps, and 16 kbps in accordance with a transmission rate, 106 kbps, 212 kbps, 424 kbps, and 848 kbps. The head of the communication frame of Type-B therefore includes the falling edge interval of 12 etu to 14 etu. In addition, the counter value Dc from the falling edge to the next falling edge in the head of the frame of the communication method of Type-B in Table 2 conforms to the time interval of 12 etu to 14 etu corresponding to the transmission rate.

The head of the communication frame of the communication method of Felica illustrated in FIG. 6C includes a logical value "0" having a length of 48 bits or more.

Figure 7A:
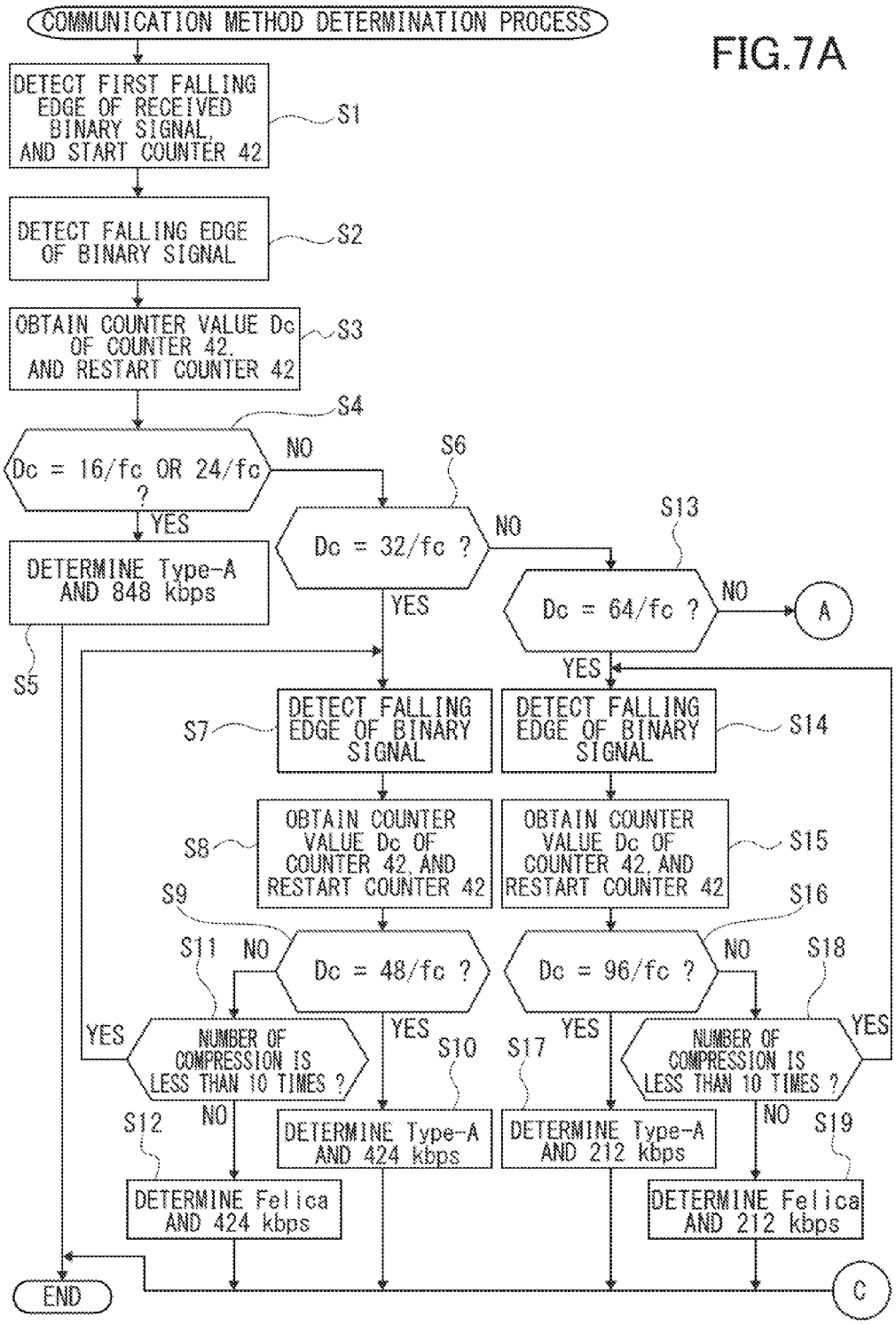
Figure 7C:
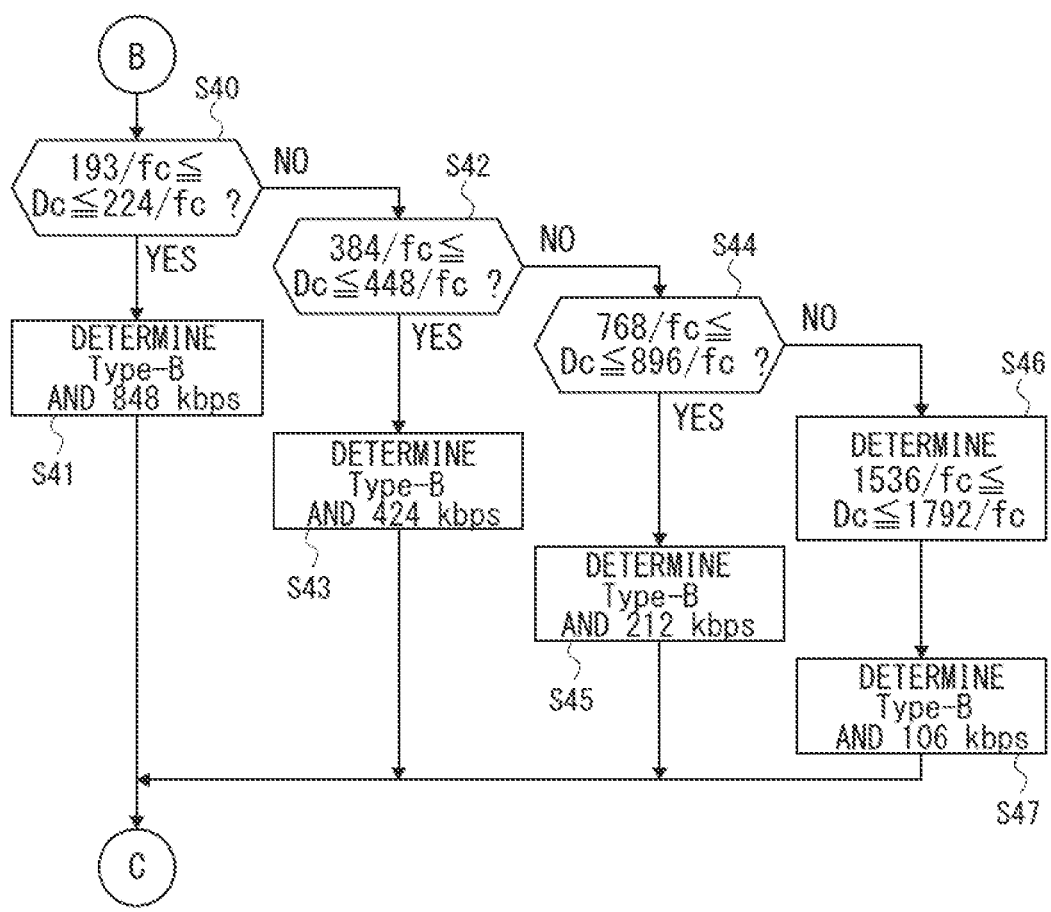

FIGS. 7A to 7C are flow charts illustrating the communication method determination process which is executed by the method determiner 32 in FIG. 4.

Referring to FIG. 7A, as soon as the communication method determination process is started, the falling edge detector 41 detects the first falling of the binary signal received from the demodulator 21, outputs a reset signal to the counter 42, and starts the counting of the counter 42 in Step 1. In Step 2, when the falling edge detector 41 detects the next falling of the binary signal, the falling edge detector 41 outputs the detection signal indicating the detection of the falling to the method and transmission rate determiner 43.

In Step 3, the method and transmission rate determiner 43 obtains the first counter value Dc indicating the falling edge interval between the first falling edge and the next falling edge by receiving the data of the counter value Dc from the counter 42. The falling edge detector 41 also outputs a reset signal to the counter 42, and restarts the counting of the counter 42.

In Step 4, the method and transmission rate determiner 43 determines whether or not the counter value Dc is 16/fc or 24/fc. In the case of YES, in Step 5, the method and transmission rate determiner 43 determines that the communication method and the transmission rate of the received signal are Type-A and 848 kbps based on the data in Table 2. The method and transmission rate determiner 43 also outputs the determination result signal indicating the determination result to the decoding section 31, and completes the communication method determination process.

When it is determined that the counter value Dc is not 16/fc or 24/fc (No in Step 4), the method and transmission rate determiner 43 determines whether or not the counter value Dc is 32/fc in Step 6. When it is determined that the counter value Dc is 32/fc (Yes in Step 6), in Step 7, the method and transmission rate determiner 43 detects the falling edge similar to the process in Step 2. In Step 8, the method and transmission rate determiner 43 obtains the counter value Dc similar to the process in Step 3. The falling edge detector 41 outputs a reset signal to the counter 42, and restarts the counter 42. Then, the process proceeds to Step 9.

In Step 9, the method and transmission rate determiner 43 determines whether or not the counter value Dc is 48/fc or not. In this case, in the case of YES, in Step 10, the method and transmission rate determiner 43 determines that the communication method and transmission rate are Type-A and 424 kbps, outputs the determination result signal indicating the determination result to the decoding section 31, and completes the communication system determination process.

When it is determined that the counter value Dc is not 48/fc (No in Step 9), the method and transmission rate determiner 43 determines whether or not the number of comparisons is less than 10 in Step 11. The number of comparisons is a number in which a process (S4, S6, S9) of comparing the counter value Dc with a predetermined number is executed. However, the execution number of comparison processes (for example, Steps 4, 6) which are executed based on the counter value Dc obtained at one timing is regarded as once. Therefore, the number of comparisons is equal to the number in which the counter value Dc is obtained by the method and transmission rate determiner 43.

When the number of comparison is less than 10 (YES in Step 11), the processes after Step 7 are re-executed. After that, the loop processes of Steps 7 to 9 and Step 11 are executed until it is determined that the counter value Dc is 48/fc (YES in Step 9) or the number of comparisons exceeds 10 (NO in Step 11).

When the number of comparison exceeds 10 (NO in Step 11), the binary signal in this case can be specified that the communication method and the transmission rate are Felica and 424 kbps based on the frame configuration of Felica in FIG. 6C and the data in Table 2. In the case of NO in Step 11, the method and transmission rate determiner 43 determines that the communication method and transmission rate are Felica and 424 Kbps in Step 12. The method and transmission rate determiner 43 also outputs the determination result signal indicating the determination result to the decoding section 31, and completes the communication method determination process.

In Step 6 illustrated in FIG. 7A, when it is determined that the counter value Dc is not 32/fc (No in Step 6), the method and transmission rate determiner 43 determines whether or not the counter value Dc is 64/fc in Step 13. In the case of YES, the process proceeds to Step 14 while the process proceeds to Step 20 in FIG. 7B in the case of NO. Next, after Step 14, the method and transmission rate determiner 43 executes Steps 14, 15 similar to Steps 7, 8. Next, in Step 16, the method and transmission rate determiner 43 determines whether or not the counter value Dc is 96/fc. In the case of YES in Step 16, the method and transmission rate determiner 43 determines that the communication method and the transmission rate are Type-A and 212 kbps in Step 17. The method and transmission rate determiner 43 also outputs the determination result signal indicating the determination result to the decoding section 31, and completes the communication method determination process.

In the case of NO in Step 16, it is determined whether or not the number of comparisons exceeds 10 in Step 18. In the case of YES, the process goes back to Step 14 while the process proceeds to Step 19 in the case of NO. In Step 19, it is determined that the communication method and transmission rate are Felica and 212 kbps, and the determination result is output to the decoding section 31, and the communication method determination process is completed.

Referring to FIG. 7B, the method and transmission rate determiner 43 determines whether or not the counter value Dc is 48/fc in Step 20. In the case of YES, the process proceeds to Step 21 while the process proceeds to Step 22 in the case of NO. In Step 22, the method and transmission rate determiner 43 determines whether or not the counter value Dc is 96/fc. In the case of YES, the process proceeds to Step 23 while the process proceeds to Step 24 in the case of NO. The method and transmission rate determiner 43 determines whether or not the counter value Dc is 128/fc in Step 24. In the case of YES, the process proceeds to Step 25 while the process proceeds to Step 26 in the case of NO. In Step 26, the method and transmission rate determiner 43 determines whether or not the counter value Dc is 192/fc. In the case of YES, the process proceeds to Step 27 while the process proceeds to Step 40 in FIG. 7C in the case of NO.

In Step 21, the method and transmission rate determiner 43 determines that the communication method and transmission rate are Type-A and 424 kbps, outputs the determination result to the decoding section 31, and completes the communication method determination process. In Step 23, the method and transmission rate determiner 43 determines that the communication method and the transmission rate are Type-A and 212 kbps, outputs the determination result to decoding section 31, and completes the communication method determination process. In Step 25, the method and transmission rate determiner 43 determines that the communication method and the transmission rate are Type-A and 106 kbps, outputs the determination result to the decoding section 31, and completes the communication method determination process.

In Step 27, the method and transmission rate determiner 43 detects the falling of the binary signal similar to Step 2 in FIG. 7A, and obtains the counter value Dc of the counter 42 in Step 28. Next, in Step 29, the method and transmission rate determiner 43 determines whether or not the counter value Dc is 128/fc, 192/fc or 256/fc. In the case of YES, the process proceeds to Step 30 while the process proceeds to Step 43 in the case of NO. In Step 30, it is determined that the communication method and the transmission rate are Type-A and 106 bps or Type-B and 848 bps, and the process proceeds to Step 31.

When the counter value Dc indicating the falling edge interval is 192/fc, it is apparent from Table 2 that the communication method and the transmission rate are Type-A and 106 kbps or Type-B and 848 kbps. However, it is difficult to distinguish these two communication methods and transmission rates to each other from Table 2, but it is standardized for both of Type-A and Type-B to communicate only at 106 kbps in the beginning (polling) of the communication.

In Step 31, it is determined that the method and transmission rate determiner 43 determines whether or not the polling is executed at 106 kbps. In this case, in the case of YES, the method and transmission rate determiner 43 determines that the communication method and the transmission rate are Type-A and 106 kbps, outputs the determination result to the decoding section 31, and completes the communication method determination process. On the other hand, in the case of NO in Step 31, the method and transmission rate determiner 43 determines that the communication method and the transmission rate are Type-B and 848 kbps, outputs the determination result to the decoding section 31, and completes the communication method determination process.

In Step 40 of FIG. 7C, the method and transmission rate determiner 43 determines whether or not the counter value Dc is 193/fc or more and 224/fc or below within the range of the falling edge interval of the communication method of Type-B and the transmission rate of 848 kbps in Table 2. On the other hand, in the case of YES, the process proceeds to Step 41 while the process proceeds to Step 42 in the case of NO. In Step 41, the method and transmission rate determiner 43 determines that the communication method and the transmission rate are Type-B and 848 kbps, outputs the determination result to the decoding section 31, and completes the communication method determination process.

In Step 42, the method and transmission rate determiner 43 determines whether or not the counter value Dc is 384/fc or more and 448/fc or below which is the range of the falling edge interval of the communication method of Type-B and the transmission rate of 424 kbps in Table 2. In the case of YES, the process proceeds to Step 43 while the process proceeds to Step 44 in the case of NO. In Step 43, the method and transmission rate determiner 43 determines that the communication method and the transmission rate are Type-B and 424 kbps, outputs the determination result to the decoding section 31, and completes the communication method determination process.

In Step 44, the method and transmission rate determiner 43 determines whether or not the counter value Dc is 768/fc or more and 869/fc or below which is the range of the falling edge interval of the communication method of Type-B and the transmission rate of 212 kbps in Table 2. In the case of YES, the process proceeds to Step 45 while the process proceeds to Step 46 in the case of NO. In Step 45, the method and transmission rate determiner 43 determines that the communication method and the transmission rate are Type-B and 212 kbps, outputs the determination result to the decoding section 31, and completes the communication method determination process.

In Step 46, the method and transmission rate determiner 43 determines that the counter value Dc is 1536/fc or more and 1792/fc or below. The range of the counter value Dc is a range of the falling edge interval of the communication method of Type-B and the transmission rate of 106 kbps in Table 2. Next, in Step 47, the method and transmission rate determiner 43 determines that the communication method and the transmission rate are Type-B and 106 kbps, outputs the determination result to the decoding section 31, and completes the communication method determination process.

FIG. 8 is a timing chart illustrating a setting example of a tolerable jitter as a time period in which the jitter of the counter value Dc is tolerated for determining the counter value Dc by tolerating the jitter of the falling timing of the binary signal in the communication method determination processes in FIGS. 7A, 7B, and 7C. In FIG. 8, the hatched time period shows the tolerable jitter of the falling timing predetermined by a communication method standard. The communication method and transmission rate determiner 43 can be configured to determine that the communication method and the transmission rate of the binary signal correspond to the tolerable jitter when the counter value Dc is within the tolerable jitter range. According to such a modified example, even if the binary signal waveform deviates from the specification defined by a communication method standard, the communication method and the transmission rate can be accurately recognized as long as the binary signal waveform is within a predetermined range. Noise to the binary signal and the influence due to the pulse variation can be therefore controlled, and the communication stability can be thus ensured.

According to Embodiment 1 of the present invention, the method determiner 32 determines whether or not the binary signal of the received radio signal is a binary signal of a radio signal with any of a plurality of communication methods. In this case, the method determiner 32 detects the falling edge interval of the binary signal, and compares the detected falling edge interval with the falling edge interval of the binary signal predetermined in a plurality of communication methods. The method determiner 32 executes such comparisons, to determine whether or not the binary signal of the received radio signal is a binary signal of a radio signal with any of a plurality of the communication methods.

According to the above configuration, the communication method and the transmission rate can be determined without interrupting a protocol by detecting the falling edge interval of the binary signal, and comparing the detected falling edge interval with the falling edge interval in Table 2 predetermined by each communication standard. Even if the binary signal demodulated by the demodulator 21 includes a variation in a pulse width, for example, the communication method determination process can be appropriately executed by determining with a tolerable edge as described above. A determination error of the communication method can be therefore prevented, compared with the conventional technique. A plurality of communication methods and a plurality of transmission rates received from the non-contact type reader-writer 2 can be determined by the communication method determination process, so as to correspond to various communication methods.

A clock extracted from the carrier wave by the clock regenerator 21a is used for the measurement of the falling edge interval as a standard clock. A communication method can be therefore determined without providing a separate clock generator in the non-contact communication circuit 20 or the IC card 1.

In Embodiment 1, the method determiner 32 measures the falling edge interval by using a clock having a frequency fc of a carrier wave as a standard clock. However, the present invention is not limited the method determiner 32, The method determiner 32 can use a clock having a frequency of an integral multiple of a clock extracted from the carrier wave as a standard clock for measuring the falling edge interval. Such a standard clock can be generated by providing a divider in the non-contact communication circuit 20, for example. The non-contact communication circuit 20 can therefore use a clock having a speed slower than a carrier wave frequency fc and synchronized with the carrier wave for operating the communication method determination process, or the like, and the power consumption of the IC card 1 can be lowered.

In Embodiment 1, the clock generator 21a is provided in the non-contact communication circuit 20 for measuring the falling edge interval. However, the present invention is not limited thereto. A clock which is supplied from the external circuit of the IC card 1 can be used as a standard clock for measuring the falling edge interval. In this case, an external clock can be used for the communication method determination process, and it can be simply mounted not only on the IC card 1 but also on an incorporation device, the reader-writer 2, or the like.

In the above Embodiment 1, the non-contact communication circuit 20 is provided in the IC card 1. However, the present invention is not limited thereto, and the non-contact communication circuit 20 can be provided in the reader-writer 2. In this case, the non-contact communication circuit 20 determines a communication method by a frame (for example, polling) transmitted by the reader-writer 2, and determines a transmission rate as a response from the IC card 1 according to the communication method.

In the above Embodiment 1, the non-contact communication circuit 20 is configured as an integrated circuit. However, the present invention is not limited thereto. The demodulator 21 and the modulator 25 can be a front-end circuit which is separated from each section 22 to 24.

In the above Embodiment 1, in the communication method determination process, the method determiner 32 detects the time interval between the edges of the binary signal by counting the counter value Dc. However, the present invention is not limited to the above-embodiment, and the method determiner 32 can detect the time interval by timing a time interval between falling edges.

In the above embodiment 1, in the communication method determination process of FIGS. 7A to 7C, the method determiner 32 determines a communication method and a transmission rate based on the falling edge interval. However, the present invention is not limited thereto, and the method determiner 32 can determine a communication method and a transmission rate based on a time interval between rising edges of a binary signal detected by the falling edge detector 41 illustrated in FIG. 4.

In the above Embodiment 1, in the communication system determination process of FIGS. 7A to 7C, the method and transmission rate determiner 43 determines a communication method and a transmission rate based on the determination whether or not the number of comparisons is less than 10. In this case, when a communication method and a transmission rate are Type-A and 424 kbps or Type-A and 212 kbps, the determination can be made while the number of comparisons is less than 10. However, the present invention is not limited thereto, and the communication method and the transmission rate can be determined based on the determination whether or not the number of comparisons is less than 7. In view of the bit data b0 to b6 in Table 3, if the number of comparison is 7 or more, the determination error of the communication method of Type-A as the communication method of Felica can be prevented.

In the above Embodiment 1, in the communication method determination process of FIGS. 7A to 7C, the method and transmission rate determiner 43 determines the communication method and the transmission rate based on the determination whether or not the polling is performed at a predetermined transmission rate of 106 kbps. However, the present invention is not limited thereto, and the communication and transmission rate determiner 43 determines the communication device and the transmission rate based on the determination whether or not the polling is performed at a transmission rate different from 106 kbps based on a plurality of communication methods to be determined.

Embodiment 2

Figure 9B:
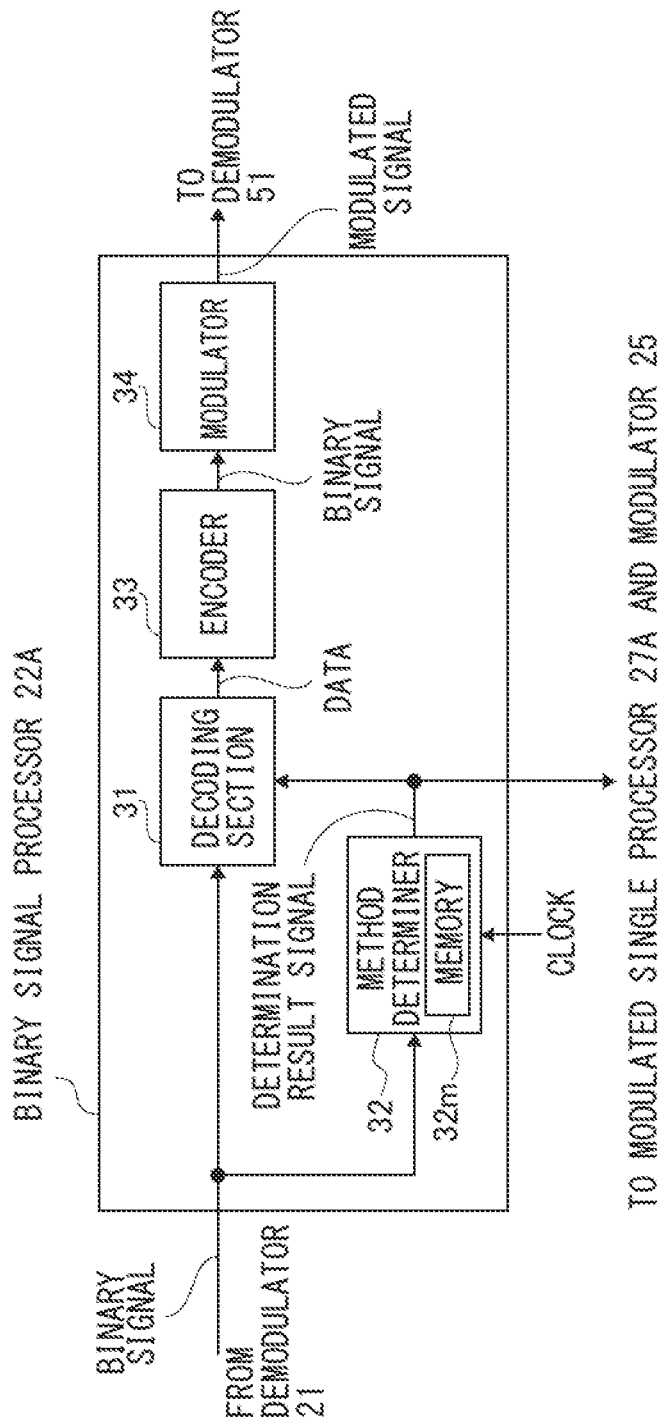
FIG. 9B is a block diagram illustrating the configuration of a binary signal processor 22A illustrated in FIG. 9A.
Figure 9C:
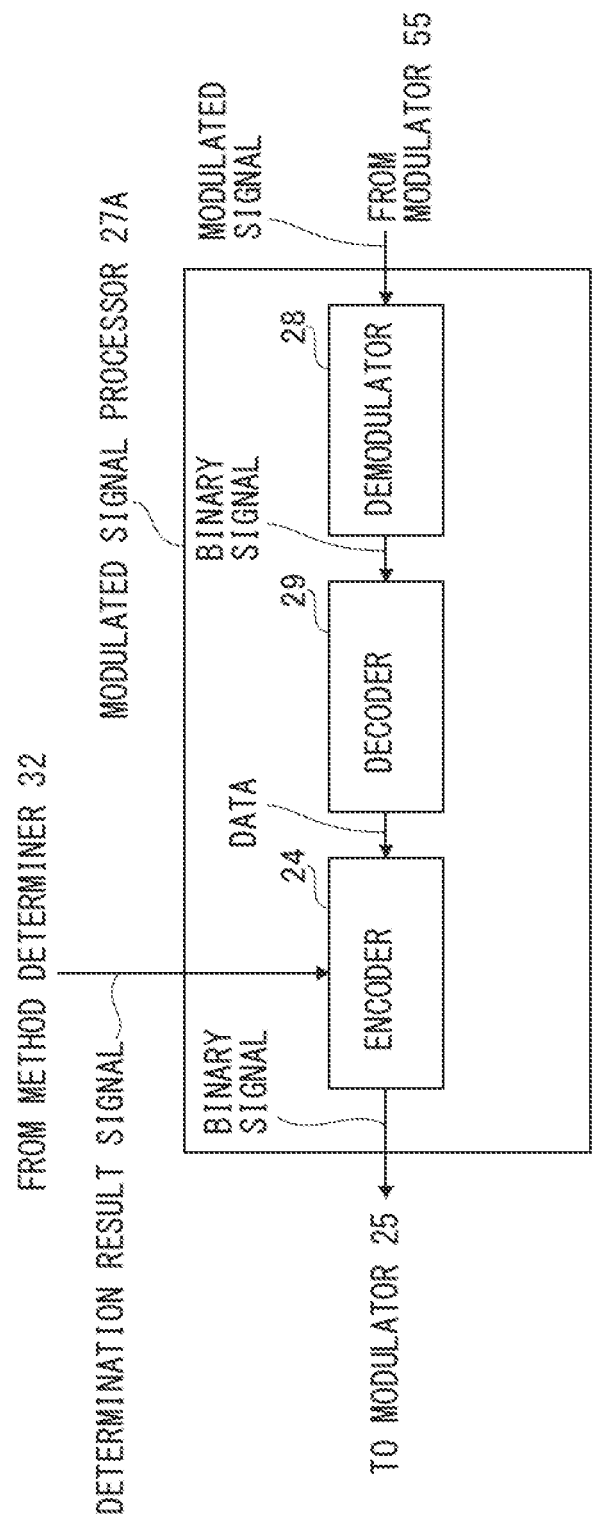
FIG. 9C is a block diagram illustrating the configuration of a modulation signal processor 27A illustrated in FIG. 9A.

FIG. 9A is a block diagram illustrating the configuration of an IC card 1A according to Embodiment 2 of the present invention. FIG. 9B is a block diagram illustrating the configuration of a binary signal processor 22A in FIG. 9A. FIG. 9C is a block diagram illustrating the configuration of a modulation signal processor 27A in FIG. 9A.

In FIG. 9A, the IC card 1A according to Embodiment 2 differs from the IC card 1 illustrated in FIG. 2 according to Embodiment 1 in the following points.

(1) A non-contact communication circuit 50 is further provided.

(2) The non-contact communication circuit 20 is substituted for a non-contact communication circuit 20A which is a front-end circuit of the non-contact communication circuit 50 in the above (1).

The non-contact communication circuit 20A enables near-field wireless communication with the reader-writer 2 with a plurality of communication methods (for example, a plurality of communication methods selected from three communication methods in Table 1, hereinafter referred to as a plurality of first communication methods). The non-contact communication circuit 20A enables communication with the non-contact communication circuit 50 with a pre-determined fixed communication method (for example, one of the three communication methods in Table 1, which is different from the first communication method determined by the method determiner 32, hereinafter referred to as a second communication method).

In FIG. 9A, the non-contact communication circuit 20A differs from the non-contact communication circuit 20 in FIG. 2 in the following points.

(a) The controller 23 and the memory 23m are removed.

(b) The decoder 22 is substituted for a binary signal processor 22A including an encoder 33 and a modulator 34 in addition to the decoding section 31 and the method determiner 32 as illustrated in FIG. 9B. In this case, the encoder 33 encodes the data received from the decoding section 31 to a binary signal with a second communication method. The modulator 34 modulates a carrier wave into a modulated signal according to the binary signal from the encoder 33 with the second communication method, and outputs the modulated signal to a demodulator 51 of a non-contact communication circuit 50.

(c) The encoder 24 is substituted for the modulation signal processer 27A including a demodulator 28 and a decoder 29 in addition to the encoder 24 as illustrated in FIG. 9C. In this case, the demodulator 28 demodulates the modulated signal from a modulator 55 into a binary signal with the second communication method. Moreover, the decoder 29 decodes the binary signal from the demodulator 28 into data with the second communication method, and outputs the data to the encoder 24.

In FIG. 9A, the non-contact communication circuit 50 includes the demodulator 51 which receives the modulated signal from the binary signal processor 22A, and demodulates the modulated signal into the binary signal with the second communication method, and a decoder 52 which decodes the binary signal from the demodulator 51 into data with the second communication method. The non-contact communication circuit 50 includes a controller 53, a memory 53m connected to the controller 53, an encoder 54 which encodes the data output from the controller 53 into the binary signal with the second communication method, and a modulator 55 which modulates the binary signal from the encoder 54 into the modulated signal with the second communication method. In this case, the controller 53 and the memory 53m include operations similar to those of the controller 22 and the memory 23m in FIG. 2.

The non-contact communication circuit 20A includes the method determiner 32, the demodulator 21 (first demodulator) which demodulates the received radio signal into the binary signal, the decoding section 31 (first decoder) which demodulates into the data the binary signal demodulated by the demodulator 21 with the first communication method determined from a plurality of communication methods by the method determiner 32, the encoder 33 (first encoder) which encodes the data decoded by the decoding section 31 into the binary signal with the second communication method different from the determined first communication method, the modulator 34 (first modulator) which modulates the binary signal encoded by the encoder 33 into the modulated signal, and outputs the modulated signal, the demodulator 28 (second demodulator) which demodulates the modulated signal input from the modulator 43 into the binary signal with the second communication method, the decoder 29 (second decoder) which decodes the binary signal demodulated by the demodulator 28 into the date with the second communication method, the encoder 24 (second encoder) which encodes the data decoded by the decoder 29 into the binary signal with the determined first communication method, and the modulator 25 (second modulator) which modulates the carrier wave into the radio signal in accordance with the binary signal encoded by the encoder 24.

The above configuration includes the operations and effects similar to those in Embodiment 1. In the IC card 1A, the non-contact communication circuit 20A operates as a front-end circuit of the non-contact communication circuit 50. The non-contact communication circuit 50 can therefore communicate with the reader-writer 2 through the non-contact communication circuit 20A even if the fixed second communication method which is used by the non-contact communication circuit 50 differs from the first communication method which is used by the reader-writer 2. Thus, the non-contact communication circuit 50 can communicate with the reader-writer 2 without changing the configuration of the non-contact communication circuit 50.

Embodiment 3

Figure 10A:
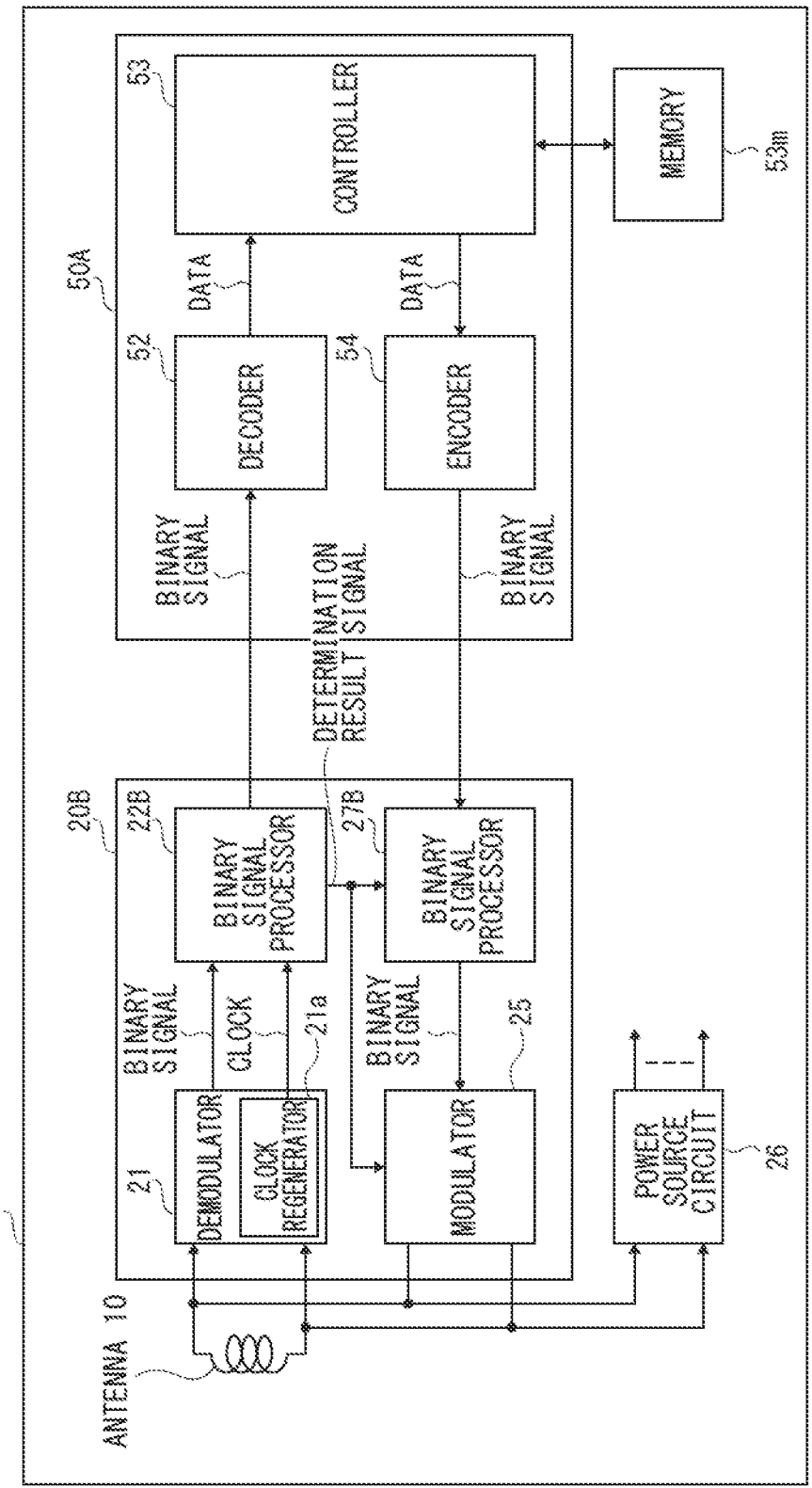
FIG. 10A is a block diagram illustrating the configuration of an IC card 1B according to Embodiment 3 of the present invention.
Figure 10B:
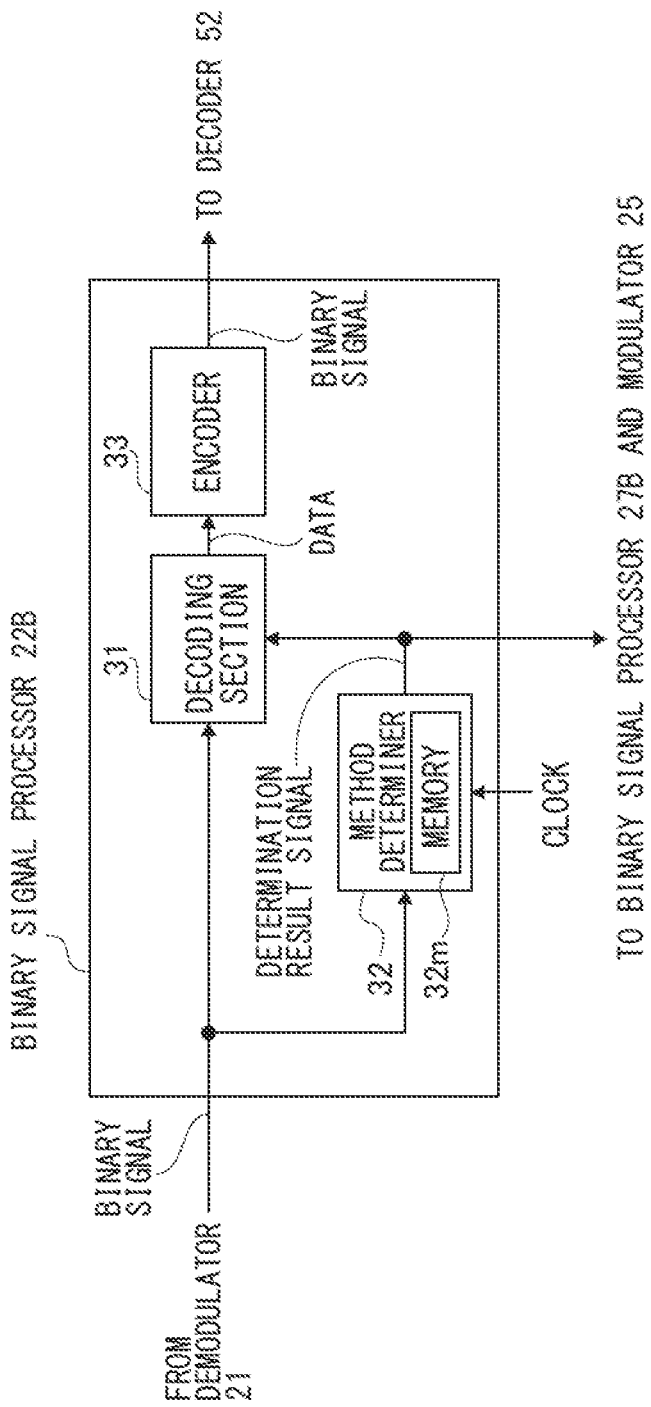
FIG. 10B is a block diagram illustrating the configuration of a binary signal processor 22B illustrated in FIG. 10A.
Figure 10C:
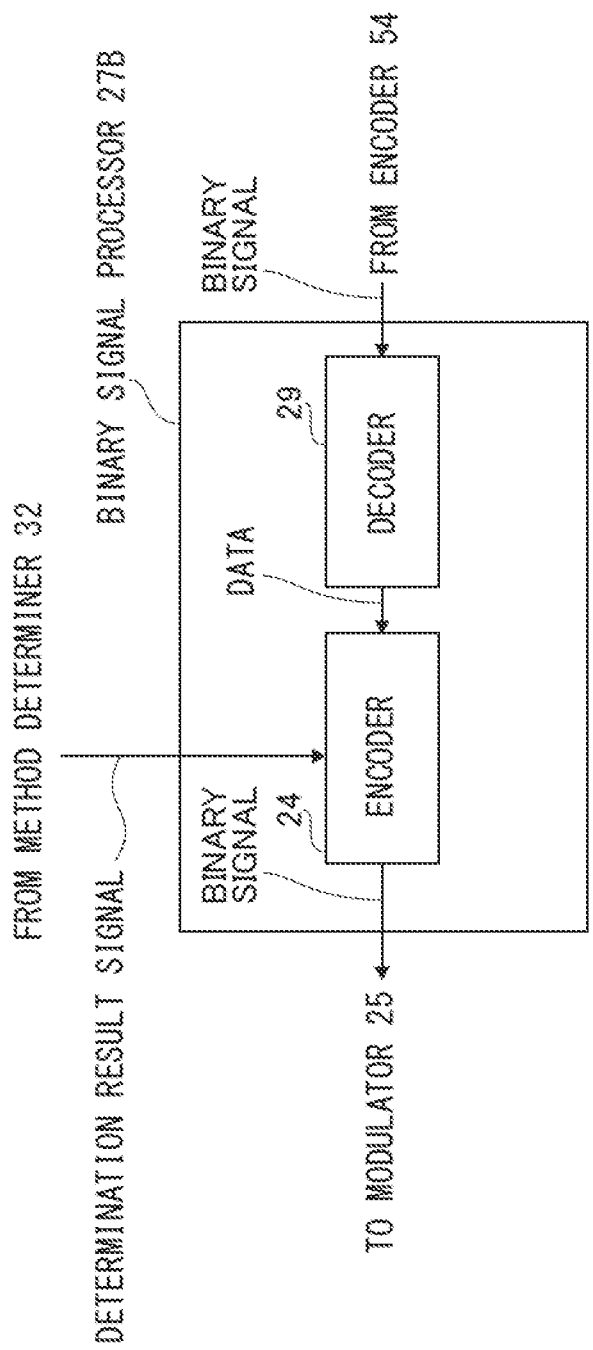
FIG. 10C is a block diagram illustrating the configuration of a binary signal processor 27B illustrated in FIG. 10A.

FIG. 10A is a block diagram illustrating the configuration of an IC card IB according to Embodiment 3 of the present invention. FIG. 10B is a block diagram illustrating the configuration of a binary signal processor 22B in FIG. 10A. FIG. 10C is a block diagram illustrating the configuration of a binary signal processor 27B in FIG. 10A.

In FIG. 10A, the IC card 1B according to Embodiment 3 differs from the IC card 1 of Embodiment 2 illustrated in FIG. 9A in the following points.

(1) The non-contact communication circuit 50 is substituted for a non-contact communication circuit 50A from which the demodulator 51 and the modulator 55 are removed.

(2) The non-contact communication circuit 20A is substituted for the non-contact communication circuit 20B.

In FIG. 10A, the non-contact communication circuit 20B differs from the non-contact communication circuit 20A in FIG. 9A in the following points.

(a) The binary signal processor 22A is substituted for a binary signal processor 22B from which the modulator 34 is removed. In this case, the encoder 33 outputs to the decoder 52 the encoded binary signal with the second communication method.

(b) The modulation signal processor 27A is substituted for the binary signal processor 27B from which the demodulator 28 is removed. In this case, the decoder 29 decodes into data the binary signal from the encoder 54 with the second communication method, and outputs the data to the encoder 24.

The non-contact communication circuit 20B includes the method determiner 32, the demodulator 21 which demodulates the received radio signal into the binary signal, the decoding section 31 (first decoder) which decodes the binary signal demodulated by the demodulator 21 into the data with the first communication method determined by the method determiner 32, the encoder 33 (first encoder) which encodes the data decoded by the decoder 31 into the binary signal, and outputs the binary signal with the second communication method different from the determined first communication method, the decoder 29 (second decoder) which decodes the binary single input from the encoder 33 into the data with the second communication method, the encoder 24 (second encoder) which encodes the data decoded by the decoder 29 into the binary signal with the determined first communication method, and the modulator 25 which modulates the carrier wave into the radio signal in accordance with the binary signal encoded by the encoder 24 with the determined first communication method.

With the above configuration, the operations and effects similar to those in Embodiment 2 will be obtained. The non-contact communication circuit 50A does not execute a demodulation process and a modulation process different from the non-contact communication circuit 50 in FIG. 9A, so that the power consumption of the non-contact communication circuit 50A is smaller than the power consumption of the non-contact communication circuit 50 in FIG. 9A.

According to the embodiments of the present invention, a non-contact communication method determination circuit which can prevent miss-determination of a communication method can be provided.

While the embodiments of the present invention have been described in detail above with reference to the drawings, the above embodiments are merely examples of the present invention. The present invention is not limited to only the configurations of the above embodiments, but, needless to say, includes changes in design and the like without departing from the scope of the present invention.

The present application is based on and claims priority from Japanese Patent Application No. 2013-117064, filed on Jun. 3, 2013, the disclosure of which is hereby incorporated by reference in its entirety.

The invention claimed is:

1. A non-contact communication method determination circuit, comprising:
   a determiner which determines whether or not a binary signal of a received radio signal was communicated with any of a plurality of first non-contact communication methods; and
   a falling edge detector to detect falling edges of the binary signal of the received radio signal and outputs a detection signal indicating detection of the falling edges to the determiner, wherein
   the determiner detects, based on the detection signal received from the falling edge detector, a time interval between the detected falling edges of the binary signal, and the determiner compares the detected time interval with a predetermined time interval between edges of a binary signal in the plurality of first non-contact communication methods, so as to determine whether or not the binary signal of the received radio signal was communicated with any of the plurality of first non-contact communication methods.

2. A non-contact communication method determination circuit, comprising: a determiner which determines whether or not a binary signal of a received radio signal is a binary signal of a radio signal with any of a plurality of first non-contact communication methods, wherein
   the determiner is configured to detect a time interval between edges of the binary signal, and compares the detected time interval with a predetermined time interval between edges of a binary signal in the plurality of first non-contact communication methods, so as to determine whether or not the binary signal of the received radio signal is the binary signal of the radio signal with any of the plurality of first non-contact communication methods, and
   the time interval between the edges of the binary signal is a time interval between falling edges of the binary signal, or a time interval between raising edges of the binary signal, and wherein
   the determiner is configured to determine whether or not the binary signal of the received radio signal is the binary signal of the radio signal with any of the plurality of first non-contact communication methods based on the number of comparisons.

3. The non-contact communication method determination circuit according to claim 1, wherein the determiner is configured to determine whether or not the binary signal of the received radio signal was communicated with any of the plurality of first non-contact communication methods based on whether or not polling is executed at a predetermined transmission rate.

4. The non-contact communication method determination circuit according to claim 1, wherein the predetermined time interval between the edges of the binary signal includes a range of a tolerable jitter of a predetermined range from the time interval.

5. The non-contact communication method determination circuit according to claim 1, further comprising a clock regenerator which regenerates a clock of a predetermined frequency from a carrier wave of the received radio signal, wherein
   the determiner is configured to detect the time interval based on the regenerated clock.

6. The non-contact communication method determination circuit according to claim 1, further comprising a clock regenerator which regenerates a clock of an integral multiple of a predetermined cycle from a carrier wave of the received radio signal, wherein
    the determiner is configured to detect the time interval based on the regenerated clock.

7. The non-contact communication method determination circuit according to claim 1, wherein
    the determiner is configured to detect the time interval based on a clock from an external circuit.

8. A non-contact communication circuit, comprising:
    a demodulator which demodulates a received radio signal into a binary signal;
    a decoder which decodes the demodulated binary signal into data;
    an encoder which encodes the data input from the decoder into a binary signal;
    a modulator which modulates a carrier wave into a radio signal in accordance with the encoded binary signal; and
    the non-contact communication method determination circuit according to claim 1, wherein
    the decoder is configured to decode the demodulated binary signal into data, and outputs the data with a first non-contact communication method determined by the non-contact communication method determination circuit, and
    the encoder is configured to encode the data input from the decoder into a binary signal with the first non-contact communication method, and
    the modulator is configured to modulate a carrier wave into a radio signal in accordance with the encoded binary signal with the first non-contact communication method.

9. A non-contact communication circuit, comprising:
    the non-contact communication method determination circuit according to claim 1;
    a first demodulator which demodulates a received radio signal into a binary signal;
    a first decoder which decodes the binary signal demodulated by the first demodulator into data with a first non-contact communication circuit determined by the non-contact communication method determination method;
    a first encoder which encodes the data decoded by the first decoder into a binary signal with a second non-contact communication method different from the determined first non-contact communication method;
    a first modulator which modulates the binary signal encoded by the first encoder into a modulated signal, and outputs the modulated signal with the second non-contact communication method;
    a second demodulator which demodulates the modulated signal input from the first modulator into a binary signal with the second non-contact communication method;
    a second decoder which decodes the binary signal demodulated by the second demodulator into data with the second non-contact communication method;
    a second encoder which encodes the data decoded by the second decoder into a binary signal with the determined first non-contact communication method; and
    a second modulator which modulates a carrier wave into a radio signal in accordance with the binary signal encoded by the second encoder with the determined first non-contact communication method.

10. A non-contact communication circuit, comprising:
    the non-contact communication method determination circuit according to claim 1;
    a demodulator which demodulates a received radio signal into a binary signal;
    a first decoder which decodes the binary signal demodulated by the demodulator into data with a first non-contact communication method determined by the non-contact communication method determination circuit;
    a first encoder which encodes the data decoded by the first decoder into a binary signal, and outputs the binary signal with a second non-contact communication method different from the determined first non-contact communication method;
    a second decoder which decodes the binary signal input from the first encoder into data with the second non-contact communication method;
    a second encoder which encodes the data decoded by the second decoder into a binary signal with the determined first non-contact communication method; and
    a modulator which modulates a carrier wave into a radio signal in accordance with the binary signal encoded by the second encoder with the determined first non-contact communication method.

11. The non-contact communication circuit according to claim 8, wherein the non-contact communication circuit includes a semiconductor integrated circuit.

12. An IC card comprising the non-contact communication circuit according to claim 8.

* * * * *